United States Patent
Bontu et al.

(10) Patent No.: US 10,447,455 B2
(45) Date of Patent: *Oct. 15, 2019

(54) ENABLING HIGHER-ORDER MODULATION IN A CELLULAR NETWORK

(71) Applicant: Telefonaktiebolaget LM Ericsson (publ), Stockholm (SE)

(72) Inventors: Chandra Sekhar Bontu, Nepean (CA); Xixian Chen, Ottawa (CA); Kevin Luo, Nepean (CA); Hong Ren, Kanata (CA); Hua Xu, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 50 days.

This patent is subject to a terminal disclaimer.

(21) Appl. No.: 15/846,421

(22) Filed: Dec. 19, 2017

(65) Prior Publication Data

US 2018/0123748 A1 May 3, 2018

Related U.S. Application Data

(63) Continuation of application No. 14/762,370, filed as application No. PCT/IB2015/054803 on Jun. 25, 2015, now Pat. No. 9,871,642.

(51) Int. Cl.
*H04L 5/00* (2006.01)
*H04L 1/00* (2006.01)
(Continued)

(52) U.S. Cl.
CPC .............. *H04L 5/006* (2013.01); *H04L 1/003* (2013.01); *H04L 1/0019* (2013.01);
(Continued)

(58) Field of Classification Search
CPC ... H04L 1/0003; H04L 1/0009; H04L 1/0026; H04L 27/0008; H04L 1/0025
See application file for complete search history.

(56) References Cited

U.S. PATENT DOCUMENTS 6,167,031 A 12/2000 Olofsson et al.
8,537,862 B2 9/2013 Blankenship et al.
(Continued)

FOREIGN PATENT DOCUMENTS

EP 1783943 A1 5/2007
EP 2152019 A1 2/2010
(Continued)

OTHER PUBLICATIONS

International Search Report and Written Opinion of the International Searching Authority dated Dec. 14, 2015 issued in corresponding PCT Application Serial No. PCT/IB2015/054803, consisting of 18-pages.
(Continued)

*Primary Examiner* — Jung H Park
(74) *Attorney, Agent, or Firm* — Sage Patent Group

(57) ABSTRACT

A method for using a high order modulation (HoM) mode for communications with a wireless device in a wireless communication network is provided. The method includes receiving downlink channel quality indicator (CQI) information from an uplink transmission of the wireless device and determining a downlink channel quality estimate from the CQI information. When a measurement of the downlink channel quality estimate satisfies the predetermined criteria for a first predetermined number of consecutive uplink transmissions from the wireless device, a downlink transmission mode of the wireless device is switched from a first modulation mode to the HoM mode.

30 Claims, 9 Drawing Sheets

(51) Int. Cl.
   *H04W 24/08* (2009.01)
   *H04W 72/04* (2009.01)

(52) U.S. Cl.
   CPC ......... *H04W 24/08* (2013.01); *H04W 72/042* (2013.01); *H04W 72/0413* (2013.01)

(56) References Cited

U.S. PATENT DOCUMENTS

| | | |
|---|---|---|
| 2010/0113048 A1* | 5/2010 | Sawahashi ............ H04L 1/0019 455/450 |
| 2011/0217984 A1 | 9/2011 | Keskitalo et al. |
| 2013/0039234 A1 | 2/2013 | Li et al. |
| 2013/0215831 A1 | 8/2013 | Pang et al. |
| 2014/0092785 A1 | 4/2014 | Song et al. |
| 2014/0169300 A1 | 6/2014 | Kim et al. |
| 2015/0117568 A1 | 4/2015 | Wang et al. |
| 2015/0195819 A1 | 7/2015 | Kwon et al. |
| 2015/0312071 A1 | 10/2015 | Chen et al. |
| 2015/0358111 A1 | 12/2015 | Marinier et al. |
| 2016/0087752 A1 | 3/2016 | Xia et al. |
| 2016/0087777 A1 | 3/2016 | Ihm |
| 2016/0269218 A1* | 9/2016 | Zhang ................ H04L 27/3488 |

FOREIGN PATENT DOCUMENTS

| | | |
|---|---|---|
| WO | 2014110467 A1 | 7/2014 |
| WO | 2015030669 A1 | 3/2015 |

OTHER PUBLICATIONS

PCT Invitation to Pay Additional Fees, Form PT/ISA/206, dated Oct. 23, 2015 issued in corresponding PCT Application Serial No. PCT/IB2015/054803, consisting of 6-pages.

* cited by examiner

ENABLING HIGHER-ORDER MODULATION IN A CELLULAR NETWORK

CROSS-REFERENCE TO RELATED APPLICATION

This application is a continuation of patent application Ser. No. 14/762,370, filed Jul. 21, 2015, entitled "ENABLING HIGHER-ORDER MODULATION IN A CELLULAR NETWORK", now U.S. Pat. No. 9,871,642, issued Jan. 16, 2018, which is a U.S. National Stage Application of PCT/IB2015/054803, filed Jun. 25, 2015, entitled "ENABLING HIGHER-ORDER MODULATION IN A CELLULAR NETWORK", both of which are incorporated herein by reference in their entireties.

TECHNICAL FIELD

A method and network node for use in wireless communication systems, and more particularly, to a method and network node for using a higher order modulation mode for communications with a wireless device in a wireless communication network.

BACKGROUND

In Long Term Evolution (LTE) systems, advanced modulation has been introduced for use in downlink transmissions to increase the wireless device's data throughput when channel link quality is good. With the addition of advanced modulation, a downlink transmission from a base station or a network node or an evolved Node B (eNB) to a connected wireless device, such as user equipment (UE), can be configured as either a High Order Modulation (HoM) mode, where the modulation set used is, for example, {Quadrature Phase Shifting Key (QPSK), 16 Quadrature Amplitude Modulation (QAM), 64 QAM, 256 QAM}, or a legacy mode, where the modulation set used can be, for example, {QPSK, 16QAM, 64 QAM}. Depending upon the downlink channel feedback from the UE, the base station, e.g., eNB, can select one of these download transmission modes.

The wireless device can receive the mode selection decision from the base station in a Radio Resource Control (RRC) connection reconfiguration message. Based on the choice of the modulation set, the downlink transmission quality measurements are mapped to the Channel Quality Indicator (CQI) levels by the wireless device and reported back to the serving base station. Similarly, the serving cell or eNB or base station indicates the index of the Modulation and Coding Scheme (MCS) used in the Physical Downlink Shared Channel (PDSCH) transmission as part of the Downlink Control Information (DCI). The MCS index is selected from either the HoM mode MCS set or the legacy mode MCS set.

To maintain the backward compatibility with the legacy wireless devices, the number of MCSs and the CQI levels for both the modulation modes are kept at 32 and 16 respectively. However, the mapping of these to specific modulation and coding schemes and CQI levels depend on the specific modulation set mode selection. The switching mechanism between the modes is left to the network vendor's implementation. The serving cell sends RRC connection reconfiguration messages to the wireless device to inform of the transition from one mode to another. CQI feedback from the wireless device can be used to determine whether or not to select HoM mode. However, merely examining a series of CQI feedback reports e.g., CQI is reported as "15" in a series of feedback reports, from the wireless device is not always effective in determining whether to switch transmission to HoM mode. For example, when the wireless device is operating in one code word transmission, based on CQI feedback, the wireless device may be switched to a single layer HoM mode or a two code word, multi-layer transmission, using the legacy mode.

SUMMARY

The present disclosure advantageously provides a method and network node for using a HoM mode for communications with a wireless device in a wireless communication network. According to one broad aspect of the disclosure, a method for using a HoM mode for communications with a wireless device in a wireless communication network is provided. The method includes receiving CQI information from an uplink transmission of the wireless device, determining a downlink channel quality estimate from the CQI information, and when a measurement of the downlink channel quality estimate satisfies a predetermined criteria for a first predetermined number of consecutive CQI information uplink transmissions from the wireless device, switching a downlink transmission mode of the wireless device from a first modulation mode to the HoM mode.

According to one embodiment of this aspect, the predetermined criteria is defined as a mean of the downlink channel quality estimate being greater than a first threshold amount, and a normalized variance of the downlink channel quality estimate being less than a second threshold amount. According to another embodiment of this aspect, determining the downlink channel quality estimate from the CQI information includes mapping the CQI information to a signal to interference plus noise ratio (SINR). According to another embodiment of this aspect, determining the downlink channel quality estimate from the CQI information includes estimating a spectral efficiency of the downlink transmission from the CQI information.

According to another embodiment of this aspect, the normalized variance of the downlink channel quality estimate includes a variance of the downlink channel quality estimate normalized to the mean of the channel quality estimate. According to another embodiment of this aspect, during the first predetermined number of consecutive CQI information uplink transmissions from the wireless device, when at least one of the means of the downlink channel quality estimate is not greater than the first threshold amount and the normalized variance is not less than the second threshold amount, the downlink transmission mode of the wireless device in the first modulation mode is maintained.

According to another embodiment of this aspect, the first and the second threshold amounts are determined based at least on a performance metric of the HoM mode. According to another embodiment of this aspect, the performance metric is a measure of spectral efficiency.

According to another embodiment of this aspect, the method includes measuring the uplink transmission of the wireless device to obtain an uplink channel quality component and switching the downlink transmission mode of the wireless device from the first modulation mode to the HoM mode based at least on whether the mean of the downlink channel quality estimate is greater than a first threshold amount, the normalized variance of the downlink channel quality estimate is less than the second threshold amount, and the uplink channel quality component is not less than a third threshold amount.

According to another embodiment of this aspect, for a second predetermined number of consecutive CQI information uplink transmissions from the wireless device, if at least one of the means of the downlink channel quality estimate is not greater than a fourth threshold amount and the normalized variance is not less than a fifth threshold amount, the downlink transmission mode of the wireless device is switched from the HoM mode to the first modulation mode.

According to another embodiment of this aspect, the uplink transmission includes at least one of a sounding reference symbol (SRS) measurement, a physical random access channel (PRACH) a physical uplink control channel (PUCCH), and a physical uplink shared channel (PUSCH). According to another embodiment of this aspect, the uplink channel quality component includes an estimate of a ratio of the strength of a first path that contains a line-of-sight (LOS) channel component to the strength of a non-LOS channel component. According to another embodiment of this aspect, determining the downlink channel quality estimate from the CQI information includes mapping the CQI information to a modulation and coding scheme (MCS) value upon occurrence of a downlink transmission to the wireless device.

According to another embodiment of this aspect, the method further includes assigning a first scaling parameter to a first determination of whether the mean of the downlink channel quality estimate is greater than the first threshold amount to obtain a first weighted metric, assigning a second scaling parameter to a second determination of whether the normalized variance of the downlink channel quality estimate is less than the second threshold amount to obtain a second weighted metric, assigning a third scaling parameter to a third determination of whether the uplink channel quality component is not less than the third threshold amount to obtain a third weighted metric, and switching the downlink transmission mode of the wireless device from the first modulation mode to the HoM mode based at least on the first weighted metric, the second weighted metric and the third weighted metric.

According to another embodiment of this aspect, the first, second and third scaling parameters are based at least on a measurement accuracy of the mean of the downlink channel quality estimate, the normalized variance of the downlink channel quality estimate and the uplink channel quality component.

According to another embodiment of this aspect, the method includes determining whether to add a secondary cell to support wireless communications with the wireless device. The determining of whether to add a secondary cell to support wireless communications with the wireless device includes configuring the wireless device to perform secondary cell measurements, and receiving, from the wireless device, measurement information for the secondary cell, the measurement information including a measured link quality for the secondary cell. When the measured link quality is greater than a predetermined threshold, the secondary cell is configured for wireless communications with the wireless device; and the HoM mode is used for downlink communications with the wireless device.

According to another embodiment of this aspect, the method includes determining whether to add a secondary cell to support wireless communications with the wireless device. The determining of whether to add a secondary cell to support wireless communications with the wireless device includes configuring the secondary cell for wireless communications with the wireless device using the HoM mode for downlink communications and receiving, from the wireless device, measurement information, the measurement information including a measured link quality for neighboring secondary cells including the secondary cell configured for HoM mode downlink communications with the wireless device. When the measurement information indicates that at least one neighboring secondary cell has a greater link quality than the measured link quality for the secondary cell, support for wireless communications with the wireless device is changed from the secondary cell to the neighboring secondary cell and the HoM mode for downlink communications is maintained. When the measurement information does not indicate that at least one neighboring secondary cell has a greater link quality than the measured link quality for the secondary cell and the measured link quality for the secondary cell does not meet a performance criteria, the secondary cell is removed from wireless communications with the wireless device.

According to one broad aspect of the disclosure, a base station is provided, where the base station is configured for selectively using a HoM mode for communications with a wireless device in a wireless communication network. The base station includes a communication interface configured to receive CQI information from an uplink transmission of the wireless device, a processor, and a memory. The memory stores instructions that, when executed, configure the processor to determine a downlink channel quality estimate from the CQI information, and when a measurement of the channel quality estimate satisfies a predetermined criteria for a first predetermined number of consecutive CQI information uplink transmissions from the wireless device, switch a downlink transmission mode of the wireless device from a first modulation mode to a second modulation mode.

According to one embodiment of this aspect, the predetermined criteria is defined as a mean of the downlink channel quality estimate being greater than a first threshold amount, and a normalized variance of the downlink channel quality estimate being less than a second threshold amount. According to another embodiment of this aspect, determining the downlink channel quality estimate from the CQI information includes mapping the CQI information to a signal to interference plus noise ratio, SINR.

According to another embodiment of this aspect, determining the downlink channel quality estimate from the CQI information includes estimating a spectral efficiency of the downlink transmission from the CQI information. According to another embodiment of this aspect, the normalized variance of the downlink channel quality estimate includes a variance of the downlink channel quality estimate normalized to the mean of the channel quality estimate.

According to another embodiment of this aspect, during the first predetermined number of consecutive CQI information uplink transmissions from the wireless device, when at least one of the mean is not greater than the first threshold amount and the normalized variance is not less than the second threshold amount, the processor is further configured to maintain the downlink transmission mode of the wireless device in the first modulation mode. According to another embodiment of this aspect, the first and the second threshold amounts are determined based at least on a performance metric of the HoM mode. According to another embodiment of this aspect, the performance metric is a measure of spectral efficiency.

According to another embodiment of this aspect, the processor is further configured to measure the uplink transmission of the wireless device to obtain an uplink channel quality component, and switch the downlink transmission mode of the wireless device from the first modulation mode to the HoM mode based at least on whether the mean of the downlink channel quality estimate is greater than a first threshold amount, the normalized variance of the downlink channel quality estimate is less than the second threshold amount, and the uplink channel quality component is not less than a third threshold amount.

According to another embodiment of this aspect, for a second predetermined number of consecutive CQI information uplink transmissions from the wireless device, if at least one of the means is not greater than a fourth threshold amount and the normalized variance is not less than a fifth threshold amount, the processor is further configured to switch the downlink transmission mode of the wireless device from the HoM mode to the first modulation mode.

According to another embodiment of this aspect, the uplink transmission includes at least one of a sounding reference symbol (SRS) measurement, a physical random access channel (PRACH), a physical uplink control channel (PUCCH), and a physical uplink shared channel (PUSCH).

According to another embodiment of this aspect, the uplink channel quality component comprises an estimate of the ratio of the strength of a first path that contains a line-of-sight (LOS) channel component to the strength of a non-LOS channel component.

According to another embodiment of this aspect, determining the downlink channel quality estimate from the CQI information includes mapping the CQI information to a modulation and coding scheme (MCS) value upon occurrence of a downlink transmission to the wireless device.

According to another embodiment of this aspect, the processor is further configured to assign a first scaling parameter to a first determination of whether the mean of the downlink channel quality estimate is greater than the first threshold amount to obtain a first weighted metric, assign a second scaling parameter to a second determination of whether the normalized variance of the downlink channel quality estimate is less than the second threshold amount to obtain a second weighted metric, assign a third scaling parameter to a third determination of whether the uplink channel quality component is at least equal to the third threshold amount to obtain a third weighted metric, and switch the downlink transmission mode of the wireless device from the first modulation mode to the HoM mode based at least on the first weighted metric, the second weighted metric and the third weighted metric. According to another embodiment of this aspect, the first, second and third scaling parameters are based at least on a measurement accuracy of the mean of the downlink channel quality estimate, the normalized variance of the downlink channel quality estimate and the uplink channel quality component.

According to one broad aspect of the disclosure, a base station is provided, where the base station is configured as a secondary cell for selectively using a HoM mode for communications with a wireless device in a wireless communication network. The base station includes a communication interface configured to receive, from the wireless device, measurement information for the secondary cell, the measurement information including a measured link quality for the secondary cell, a processor, and a memory. The memory stores instructions that, when executed, configure the processor to, when the measured link quality is greater than a predetermined threshold, configure the secondary cell for wireless communications with the wireless device, and use the HoM mode for downlink communications with the wireless device.

According to one broad aspect of the disclosure, a node is provided, where the node is configured for selectively using a HoM mode for communications with a wireless device in a wireless communication network. The node includes a communication interface module configured to receive CQI information from an uplink transmission of the wireless device, a channel quality estimation module for determining a downlink channel quality estimate from the CQI information, and a modulation switching module configured to, when a measurement of the channel quality estimate satisfies a predetermined criteria for a first predetermined number of consecutive CQI information uplink transmissions from the wireless device, switch a downlink transmission mode of the wireless device from a first modulation mode to a second modulation mode. According to one embodiment of this aspect, the predetermined criteria is defined as a mean of the downlink channel quality estimate being greater than a first threshold amount, and a normalized variance of the downlink channel quality estimate being less than a second threshold amount.

According to another broad aspect of the disclosure, a method for using a HoM mode for communication with a base station in a wireless communication network is provided. The method includes sending, in an uplink transmission of a wireless device, downlink CQI information, and when a measurement of a downlink channel quality estimate satisfies a predetermined criteria for a first predetermined number of consecutive CQI information uplink transmissions from the wireless device, receiving at the wireless device a request to switch a downlink transmission mode from a first modulation mode to the HoM mode.

According to one embodiment of this aspect, the predetermined criteria includes a mean of the downlink channel quality estimate being greater than a first threshold amount, and a normalized variance of the downlink channel quality estimate being less than a second threshold amount. According to another embodiment of this aspect, during the first predetermined number of consecutive CQI information uplink transmissions from the wireless device, when at least one of the means of the downlink channel quality estimate is not greater than the first threshold amount and the normalized variance is not less than the second threshold amount, the downlink transmission mode of the wireless device in the first modulation mode is maintained.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
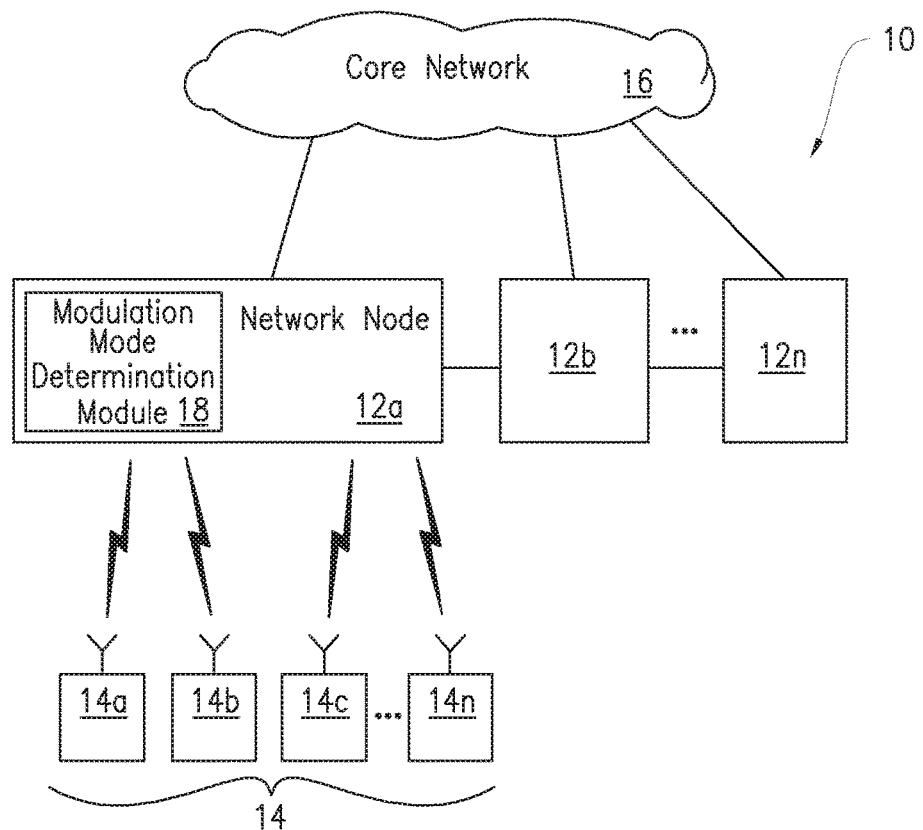
FIG. 1 is a block diagram of an exemplary system for using a HoM mode for communications with a wireless device in accordance with the principles of the present disclosure.

The methods and nodes described herein advantageously provide higher order modulation control in wireless communication networks. In particular, a measurement of the channel quality estimate compared to a predetermined criteria and, in some embodiments, an uplink channel quality component are used to determine whether to switch from a first, i.e., a legacy modulation, mode to a second, i.e., a higher order modulation, mode for the downlink transmission to the wireless device. Rather than merely observing CQI feedback from a wireless device, the present disclosure describes a methodology that, advantageously, provides a more accurate determination of whether a higher order modulation mode should be used. This is done, for example, based on evaluating mean and variance of the channel quality estimate.

Before describing in detail exemplary embodiments that are in accordance with the disclosure, it is noted that the embodiments reside primarily in combinations of apparatus components and processing steps related to providing higher order modulation determination for wireless devices. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In addition, the terms "class" and "category" are used interchangeably herein as well as the terms "classifying" and "categorizing."

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for determining whether to switch to high order modulation modes in a wireless network designated generally as "10". System 10 may be any wireless communication network including, for example, an LTE Radio Access Network (RAN). It will be understood, however, that the present disclosure is not limited to such embodiments and may be embodied generally in any type of wireless communication network according to one or more radio access technologies. System 10 includes one or more network nodes 12a, 12b . . . 12n (collectively referred to as "network node 12" or "node 12") and one or more wireless devices 14a, 14b, 14c . . . 14n (collectively referred to as "wireless device 14"). For simplicity, only three nodes 12a, 12b, and 12n are shown in FIG. 1, it being understood that more or fewer than three network nodes 12 may be implemented in system 10. Similarly, only four wireless devices 14a, 14b, 14c, and 14n are shown in FIG. 1, it being understood that more or fewer than four wireless devices 14 may be implemented in system 10. In one embodiment, node 12 is a base station, such as an eNB. However, network node 12 may also refer to a radio base station, base transceiver station, base station controller, network controller, evolved Node B (eNB), Node B, Radio Network Controller (RNC), relay node, positioning node, Evolved-Serving Mobile Location Center (E-SMLC), location server, repeater, access point, radio access point, Core network node and/or Mobile Management Entity (MME), among other network nodes known in the art. Wireless device 14 may include, for example, user equipment (UE), including devices used for machine type communication, machine to machine communication, sensors, USB, wireless embedded device, laptop mounted devices, etc. Network nodes 12 are configured to transmit to and receive information from wireless devices 14, and are also configured to communication with a core network 16.

Network node 12 includes, in one embodiment, a modulation mode determination module 18, described in further detail below, which determines, based on information received from wireless device 14, whether to implement a higher order modulation (HoM) mode for the downlink transmission to the wireless device 14. Alternately, modulation mode determination module 18 can be located in a different network node or the functions performed by modulation mode determination module 18 may be distributed across hardware such as memory and processors of multiple network nodes 12. Generally, network node 12 can implement either a legacy modulation mode or a HoM mode for each wireless device 14 in system 10. Based upon the choice of mode and corresponding modulation set implemented by network node 12, wireless device 14 selects appropriate CQI levels from the downlink transmission quality measurement and reports this information back to the serving network node 12.

Figure 2:
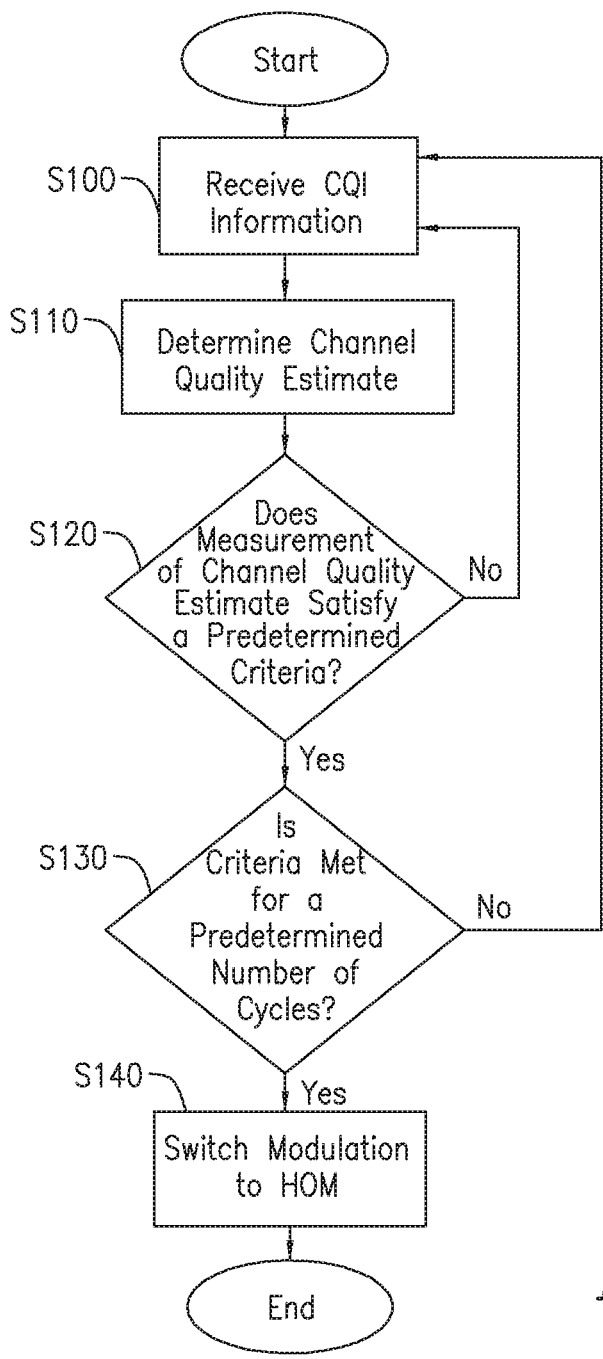
FIG. 2 is a flowchart illustrating an exemplary method for switching from a legacy mode to a HoM mode for communications with a wireless device in accordance with the principles of the present disclosure.

A flow diagram for determining whether to use a HoM mode for communication with wireless device 14 in wireless communication system 10 is illustrated in FIG. 2. The method steps illustrated in FIG. 2 may be performed at network node 12, where network node 12 instructs a wireless device 14 in which it is in communication with to switch modulation modes, i.e., from a legacy modulation mode to a HoM mode, or from a HoM mode to a legacy mode. In some instances, network node 12 may instruct wireless device 14 to maintain the modulation mode it is currently configured with.

Network node 12 receives CQI feedback information from wireless device 14 (Block S100) in the RRC connected state at either regular intervals, or periodic or aperiodic intervals. A wireless device 14 that is currently in legacy modulation mode reports CQI feedback information based on the CQI table corresponding to legacy mode as defined, for example, in 3rd Generation Partnership Project (3GPP) 36.213. Thus, network node 12 receives CQI feedback information from wireless device 14 in a series of uplink transmission reports, the CQI measured over a series of downlink transmissions. From these uplink transmission reports, network node 12 determines a channel quality estimate based on the CQI reported by wireless device 14 (Block S110). In one embodiment, the downlink channel quality estimate is determined by estimating a spectral efficiency of the downlink transmission or a signal to interference ratio (SINR) from the CQI information. In another embodiment, the downlink channel quality estimate is determined by mapping the CQI information to a modulation and coding scheme (MCS) value for a subsequent downlink transmission to wireless device 14.

Network node 12 calculates a measurement of the channel quality estimate and determines if this measurement satisfies a predetermined criteria (Block 120) for a first predetermined number of consecutive CQI information uplink transmissions from the wireless device (Block S130). If the measurement of the channel quality estimate satisfies the predetermined criteria for a first predetermined number of consecutive CQI information uplink transmissions from wireless device 14, network device 12 switches the downlink modulation mode of wireless device 14 from a first modulation mode, i.e., legacy mode, to the HoM mode (Block S140). If the predetermined criteria are not met or not met for the predetermined first number of consecutive CQI information uplink transmissions, network device 12 continues to receive CQI information from wireless device 14 (Block S100). The present disclosure is not limited to any particular number of consecutive uplink transmission reports needed to satisfy the requirement of Block S130. Typically, the number of CQI reports is determined by the rate of variation in the channel of the downlink transmission medium. Furthermore, the modulation mode switching should not be decided based on one isolated channel quality report causing too frequent modulation switches. Every modulation mode switching is associated with additional RRC connection reconfiguration procedures. The number of consecutive reports that should meet the predetermined criteria is typically decided by the rate of channel variations (indicated in the reported CQIs) and the cost involved in additional RRC messaging required for each modulation mode switch. An alternative to checking consecutive CQI reports for the predefined criteria is to filter the channel quality estimated from the CQI reports received from wireless device 14.

Figure 3:
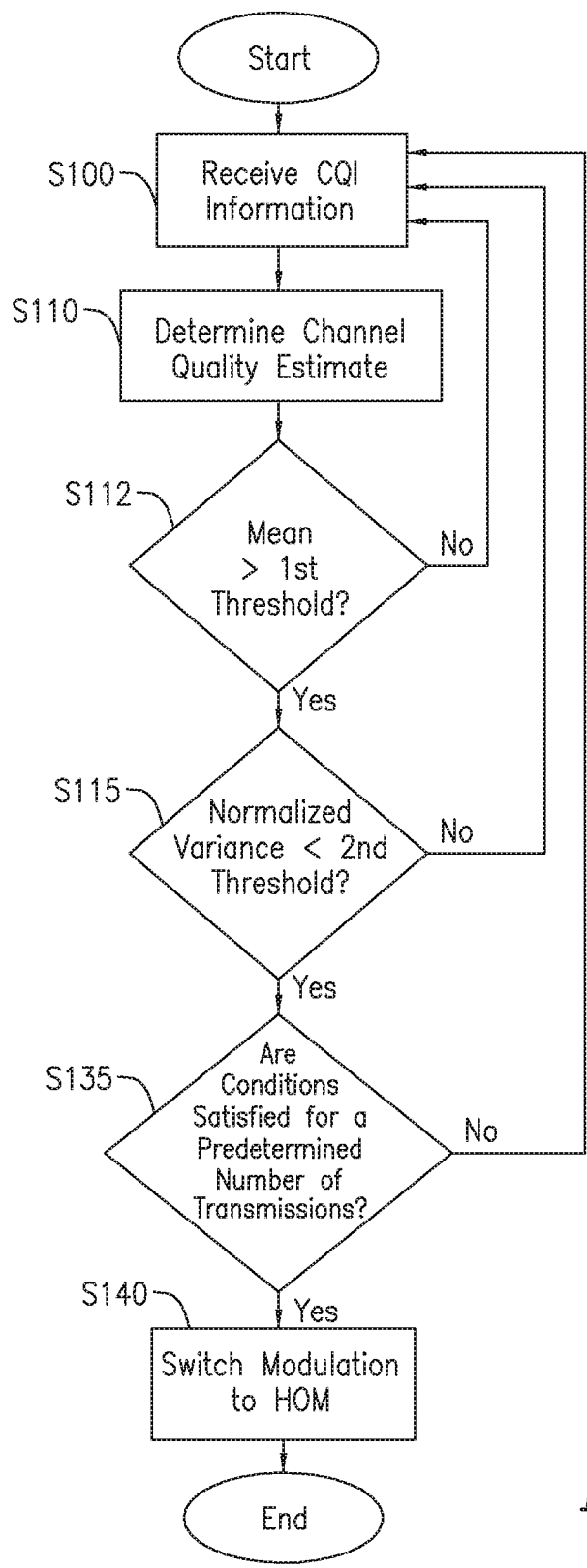
FIG. 3 is a flowchart illustrating an alternate method for switching from a legacy mode to a HoM mode using mean and normalized variance measurements in accordance with the principles of the present disclosure.

In one embodiment, and as illustrated in FIG. 3, the predetermined criteria used to determine whether switching to a HoM mode are to be implemented for a given wireless device 14 includes determining the mean of the channel quality estimate and the normalized variance of the channel quality estimate. In FIG. 3, for the initial steps, a similar process as the one depicted in FIG. 2 is implemented. Network node 12 receives CQI information from wireless device 14 (Block S100) and from this information, determines an estimate of the channel quality with respect to the wireless device 14 that sent the CQI report (Block S110). In the embodiment shown in FIG. 3, for a series of uplink transmissions with CQI reports from wireless device 14, it is first determined if a mean of the downlink channel quality estimate is greater than a first threshold amount (Block S112). If the mean of the downlink channel quality estimate is greater than a first threshold amount, it is determined if a normalized variance of the channel quality estimate is less than a second threshold amount (Block S115). The normalized variance of the downlink channel quality estimate includes the variance of the downlink channel quality estimate normalized to the mean of the channel quality estimate. It is noted that the order of Block S112 and S115 may be reversed and it is not critical to the methodology of the present disclosure which determination occurs first. Further, the present disclosure is not limited to a particular first or second threshold amount and these threshold amounts can vary according to network conditions.

In one embodiment, the first and the second threshold amounts are determined based at least on a performance metric of the HoM mode. In one embodiment, the performance metric of the HoM mode is relatively better than a performance metric of first modulation mode, i.e., legacy mode. In one embodiment, the performance metric of the HoM mode is a measure of spectral efficiency. The mean and normalized variance of the channel quality estimates are helpful in computing the mean spectral efficiency and the expected spectral efficiency variation around the mean spectral efficiency that can be obtained with the MCSs supported in a given modulation mode, i.e. legacy mode and HoM mode. When the estimated average or mean spectral efficiency of HoM mode is higher than the spectral efficiency of legacy mode, HoM mode will be preferred. Further, the variation in the estimated spectral efficiency (as computed from the normalized variance) indicates the variation in the spectral efficiency and probability of modulation mode being switched back to the legacy mode. The first and the second thresholds are appropriately selected to maximize the performance benefit of selecting a modulation mode and minimizing the frequent mode switching respectively.

If both conditions of Blocks S112 and S115 are satisfied, it is determined if both conditions are satisfied for a predetermined number of consecutive uplink transmissions with CQI reports, i.e., cycles received from wireless device 14 (Block S135). If so, the downlink transmission modulation mode for wireless device 14 may be switched from legacy mode to HoM mode (Block S140).

The comparison of the mean and normalized variances with first and second threshold amounts and the results of these comparisons may be used in the determination of whether to switch a downlink transmission mode for a particular wireless device 14 from legacy mode to HoM mode. In one embodiment, assuming $v_k$ represents a channel quality estimate based on the wideband CQI (i.e., CQI measured across the full carrier bandwidth) reported by wireless device 14 during the kth subframe, a function $f(v_k)$ can be computed as follows:

$$f(v_k)=C(\bar{v}_k>\eta)\wedge C(\tilde{v}_k<\zeta)$$

where $\bar{v}_k$ and $\tilde{v}_k$ are, respectively, the mean and normalized variance of the channel quality estimate based on the CQI feedback report and $\wedge$ indicates the logical conjunction of the two conditions. $\bar{v}_k$ and $\tilde{v}_k$ may be defined as follows:

$$\bar{v}_k = \sum_{i=-\infty}^{k} \beta_0^i v_i \text{ and}$$

$$\tilde{v}_k = \frac{1}{\bar{v}_k}\sum_{i=-\infty}^{k} \beta_1^i |v_i - \bar{v}_k|^2,$$

where $\beta_0$ and $\beta_1$ are filtering coefficients as follows: $0\leq\beta_0<1$, $0\leq\beta_1<1$.

In one embodiment, the function $C(x)$ can be defined as follows:

$C(x)=\{1$ when condition $x$ is satisfied$\}$ $C(x)=\{0$ when condition $x$ is not satisfied$\}$ Thus, referring again to FIG. 3, when both conditions are true, i.e., the mean of the channel quality is greater than a first threshold amount $\eta$ and the normalized variance is less than a second threshold amount $\zeta$, for a predetermined number of consecutive CQI intervals, the function $C(x)=1$ for both parts of $f(v_k)$ and a switch from legacy modulation mode to HoM mode can be implemented. If one or both of the conditions is not satisfied, or if one or both conditions are satisfied but not for the number of predetermined consecutive CQI intervals, i.e., the function $C(x)=0$ for one or both parts of $f(v_k)$, the switch to HoM mode is not implemented.

During mode transition, the downlink resource allocation may be communicated to wireless device 14 using downlink control information (DCI) format 1A or 1C to avoid the ambiguity of the CQI reports from wireless device 14. In certain embodiments, which comply with 3GPP standards, when wireless device 14 receives the downlink allocation using DCI format 1A or 1C, wireless device 14 uses the legacy CQI table to report CSI, regardless of the operating mode, i.e., regardless of whether the modulation mode is legacy mode or HoM mode.

In another embodiment, when wireless device 14 reports CQI per sub-band, the channel quality estimate for the jth subband and ith subframe is determined as $v_{ij}$. In this case, $v_k$ and $\tilde{v}_k$ may be defined as follows:

$$\bar{v}_k = \sum_{i=-\infty}^{k} \frac{\beta_0^i}{N_{sub}} \sum_{j=0}^{N_{sub}-1} v_{ij} \text{ and}$$

$$\tilde{v}_k = \frac{1}{\bar{v}_k}\sum_{i=-\infty}^{k} \frac{\beta_1^i}{N_{sub}} \sum_{j=0}^{N_{sub}-1} |v_{ij} - \bar{v}_k|^2,$$

where $N_{sub}$ is the number of subbands.

In one embodiment, the weighted averaging over time and frequency represents the time and frequency selectivity of the channel. The variation in the subband CQI reporting due to inter-cell interference may be mitigated by load balancing across the cells and averaging the received CQI over multiple subframes. Alternatively, relative narrow transmit power (RNTP) reports from neighbor network nodes, i.e., 12b, can also be used to account for the variation due to inter-cell interference. If the dominant interference arises from the cells within network node 12, the effect of the inter-cell interference can be computed within network node 12.

Referring again to FIGS. 2 and 3, Block S110 relates to determining a channel quality estimate from the CQI information received from wireless device 14 (Block S100). The channel quality estimate can be determined from the reported CQI information in a number of different ways. For example, the CQI can be mapped to a signal to interference plus noise ratio (SINR), or mapped to raw bit information (RBI), or mapped to an information rate (IR). In one embodiment, the CQI can be converted to SINR according to the mapping specified in 3GPP TS 36.213. Subsequently, the SINR can be mapped to the information rate according to the following:

Information bits per unit $BW=\log_2(1+\text{SINR})$

Thus, channel quality can be estimated from the CQI report by converting the CQI into a representation of an estimate of information rate that can be transmitted with a defined reception quality.

For two-code word (CW) transmission on multiple transmission layers, wireless device 14 reports CQI per CW. In this embodiment, the proposed criteria or value can be computed per CW and the decision can be made based on the combined statistics over the two CWs.

Figure 4:
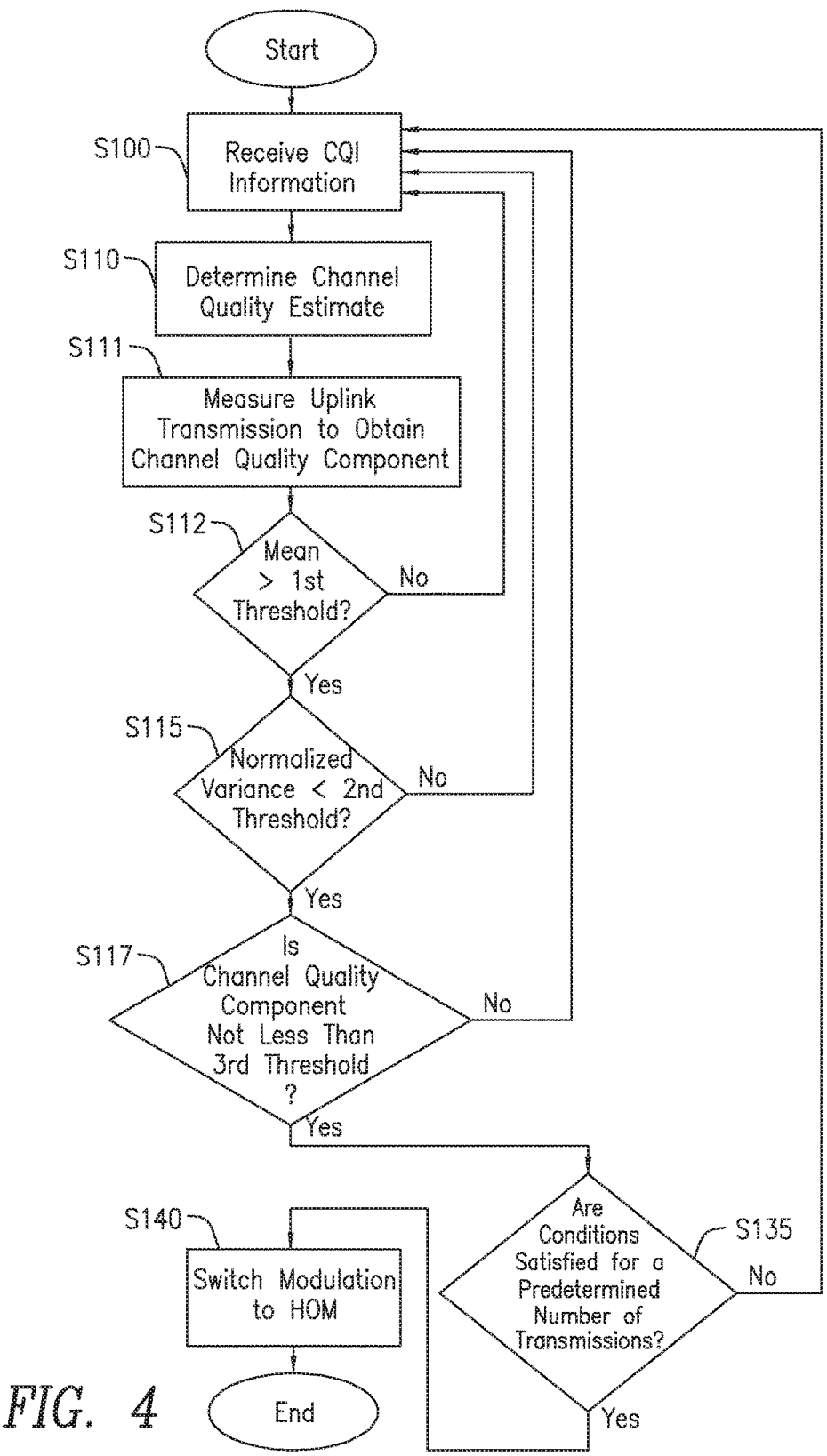
FIG. 4 is a flowchart illustrating yet another alternate method for switching from a legacy mode to a HoM mode using an uplink channel quality component in accordance with the principles of the present disclosure.

FIG. 4 illustrates an alternate embodiment of the present disclosure. In certain instances, the CQI information received by network node 12 from wireless device 14 may be sporadic, which may limit the statistics available in determining whether to switch modulation modes. In these situations, the channel quality estimate measured by network node 12 based on the uplink signal transmitted by wireless device 14 may also be used for the modulation mode switching decision. For example, as discussed above, in one embodiment (shown in FIGS. 2 and 3), two conditions may be considered in determining whether to switch from legacy modulation mode to HoM mode, as follows:

$$f(v_k)=C(\bar{v}_k>\eta)\wedge C(\tilde{v}_k<\zeta)$$

where $\bar{v}_k$ and $\tilde{v}_k$ are, respectively, the mean and normalized variance of the channel quality estimate based on the CQI feedback report and $\wedge$ indicates the logical conjunction of the two conditions. In an alternate embodiment shown in FIG. 4, a third condition may be analyzed, as follows:

$$f(v_k)=C(\bar{v}_k>\eta)\wedge C(\tilde{v}_k<\zeta)\wedge(\delta\geq\delta 0)$$

where the condition ($\delta \geq \delta_0$)) may be derived based on the channel quality estimate measured over the uplink transmission from wireless device 14, for example, a sounding reference symbol (SRS) transmission. $\delta$ may be defined as follows:

$$\delta = \frac{e_\ell}{\sum_{j=\ell+1}^{N-1} |e_j|}$$

where $e_l$ is the magnitude of the ith sample of a function resulting from the cross correlation of the received SRS samples $r_{SRS}$ with the transmitted SRS symbols, $r_{SRS}^t$.

$$e_i = \left| \sum_{k=0}^{N-1} r_{SRS}^*(k) r_{SRS}^t(k+i) \right|$$

$e_l$ is the lth sample of the cross correlation function corresponding to the smallest i such that $e_i \geq \in$. The thresholds $\in$ ($\ll N$) and $\delta_0$ are system parameters that can be tuned based on the average interference and noise at network node 12. N is the number of samples of the received signal. For example, in the absence of interference and noise, $e_e$ becomes 'N' and the denominator approaches '0' in the ideal channel conditions, i.e. channel is perfect with no fading and dispersion. In the presence of signal fading, $e_l$ becomes less than 'N', scaled by fading weight. In the presence of signal dispersion or multipath propagation, the denominator increases and the numerator decreases.

When the Fast Fourier Transform (FFT) size is small, the Single Carrier-Frequency Division Multiple Access (SC-FDMA) can be oversampled. In this instance, each symbol in the transmitted SRS sequence may be padded with phase shifted oversampling symbols to obtain $r_{SRS}^t$. $\delta$ represents the ratio of the strength of the first path that contains, if there is one, a line of sight (LOS) component to that of the other channels with only non-LOS components over the communication link between wireless device 14 and network node 12.

Thus, returning to FIG. 4, an alternate embodiment of the present disclosure is shown, where a wireless device measurement component is also considered in determining whether to switch the downlink transmission modulation mode for a wireless device 14 to a HoM mode. Similar to FIGS. 2 and 3, network node 12 receives CQI information from wireless device 14 (Block S100) and from this information, determines a channel quality estimate for that wireless device 14 (Block S110). In addition to analyzing the channel quality estimate, network node 12 measures the uplink transmission of wireless device 14 to obtain a channel quality component (Block S111). The uplink transmission can include, for example, a SRS measurement, a physical random access channel (PRACH), a physical uplink control channel (PUCCH), or a physical uplink shared channel (PUSCH). The uplink channel quality component can include, among other parameters, an estimate of the ratio of the strength of a line-of-sight (LOS) channel component to the strength of a non-LOS channel component or components.

Thus, network node 12 now considers a third component in its decision to switch the downlink transmission mode of wireless device 14 to HoM mode. It is determined if a mean of the downlink channel quality estimate is greater than a first threshold amount (Block S112). If the mean of the downlink channel quality estimate is greater than a first threshold amount, it is determined if a normalized variance of the channel quality estimate is less than a second threshold amount (Block S115). It is then determined if the channel quality component obtained in Block S111 is not less than a third threshold amount (Block S117). Again, these three determinations can occur in any order. If all three conditions of Blocks S112, S115 and S117 are satisfied, it is determined if these three conditions are satisfied for a predetermined number of transmission cycles (Block S135). If so, the downlink modulation mode for wireless device 14 may be switched from legacy mode to HoM mode (Block S140).

Figure 5:
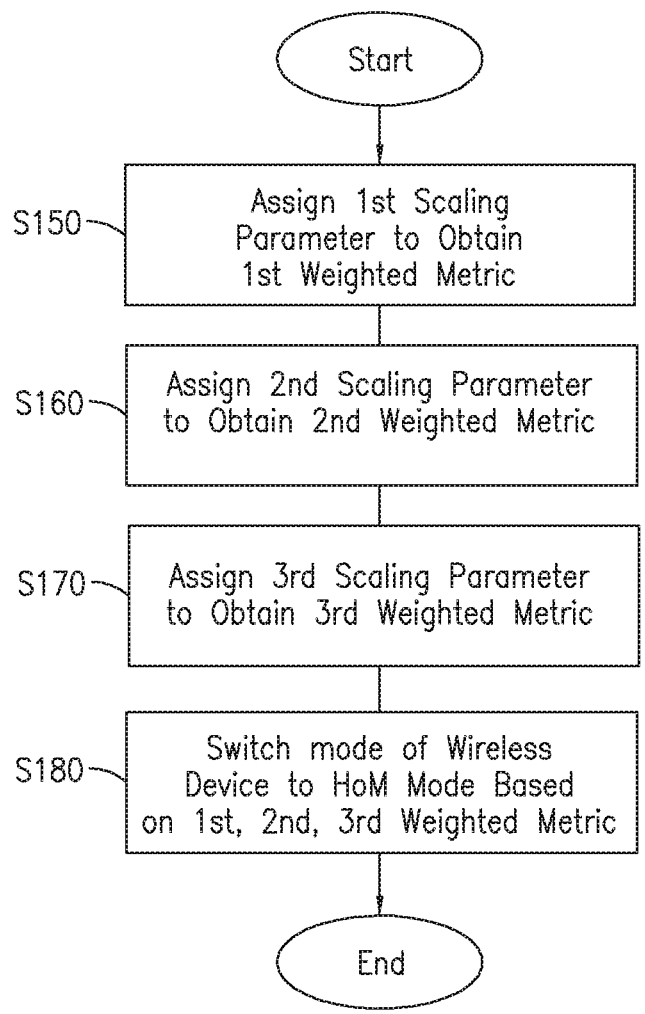
FIG. 5 is a flowchart illustrating still another alternate method for switching from a legacy mode to a HoM mode using weighted metrics in accordance with the principles of the present disclosure.

FIG. 5 illustrates an alternate embodiment where scaling parameters are assigned to each condition in order to obtain weighted metrics, which are used by network node 12 in determining whether to switch the downlink transmission mode for wireless device 14 from legacy modulation mode to HoM mode. As discussed above, in one embodiment, network node 12 considers three conditions in determining whether a switch to HoM mode for wireless device 14 is warranted. This can be governed by the following equation:

$$f(v_k) = C(\bar{v}hd\ k > \eta) \wedge C(\tilde{v}_k < \zeta) \wedge (\delta \geq \delta_0)$$

where the condition $C(\bar{v}_k > \eta)$ is based on whether a mean of the channel quality estimate is greater than a first threshold value; the condition $C(\tilde{v}_k < \zeta)$ is based on whether a normalized variance of the channel quality estimate is less than a second threshold value; and the condition ($\delta \geq \delta_0$) is based on whether the uplink transmission measurement component obtained from uplink transmission from wireless device 14 is greater than or equal to a third threshold value. The logical "and" indicator $\wedge$ requires that all three conditions be met for there to be a switch to HoM mode.

In one embodiment, network node 12 assigns a first scaling parameter to a first determination of whether the mean of the channel quality estimate is greater than the first threshold amount to obtain a first weighted metric (Blocks S150). A second scaling parameter is assigned to a second determination of whether the normalized variance of the channel quality estimate is less than the second threshold amount to obtain a second weighted metric (Block S160), and a third scaling parameter is assigned to a third determination of whether the uplink transmission measurement component is at least equal to a third threshold amount to obtain a third weighted metric (Block S170). In one embodiment, the first, second and third scaling parameters are based at least on a measurement accuracy of the mean of the downlink channel quality estimate, the normalized variance of the downlink channel quality estimate and the uplink channel quality component. The downlink transmission mode of wireless device 14 may be switched from a first modulation mode, i.e., a legacy modulation mode, to a HoM mode based at least on the first weighted metric, the second weighted metric and the third weighted metric (Block S180).

For example, the assigning of these scaling parameters to arrive at weighted metrics can be shown as follows:

$$f(v_k) = (\alpha_0 C(\bar{v}_k > \eta) + \alpha_1 C(\tilde{v}_k < \zeta) + \alpha_2 C(\delta \geq \delta 0) \geq \alpha_T)$$

where the scaling parameters $\alpha_0$, $\alpha_1$ and $\alpha_2$ are based on the importance of each of the sub-metrics. For example, in certain instance, a higher weight might be given to the determination of whether the mean of the channel quality estimate is greater than the first threshold amount than to the determination of whether the uplink transmission measurement component is at least equal to a third threshold amount to obtain a third weighted metric. Thus, in this scenario, $\alpha_0$, which applies to the determination of whether the mean of the channel quality estimate is greater than the first threshold amount) may be given a more heavily weighted scaling parameter than $\alpha_2$, which applies to the determination of whether the uplink transmission measurement component is at least equal to a third threshold amount to obtain a third weighted metric. Thus, in this instance, the weighted metric for the mean variance determination is higher than the weighted metric for the uplink transmission measurement component determination. Different weights can be applied to the scaling parameters $\alpha_0$, $\alpha_1$, $\alpha_2$, depending upon network conditions, vendor requirements and other factors.

In another embodiment, the channel quality estimate based on the reported CQI can include an average MCS value. Based on the reported CQI, an appropriate MCS is determined by the network for maximum spectral efficiency. The average MCS ($AvM_{CS}$) value can be calculated as follows:

$$AvM_{CS}=(1-a)*AvM_{CS}+a*\text{Current } M_{CS},$$

where a is a low-pass filtering coefficient between 0 and 1. Current$M_{CS}$ is the MCS used for the current transmission from network node 12 to wireless device 14. In one embodiment, if $AvM_{CS}$>ThresholdHigh, the connected wireless device 14 is switched from a legacy modulation mode to HoM mode. If $AvM_{CS}$<ThresholdLow, the connected wireless device 14 is switched from a HoM mode to legacy modulation mode, where ThresholdHigh>ThresholdLow. Average MCS computation can also be used to indicate the channel quality of the wireless device transmission. In this case, the average MCS is computed based on the MCS used for wireless device transmissions.

Figure 6:
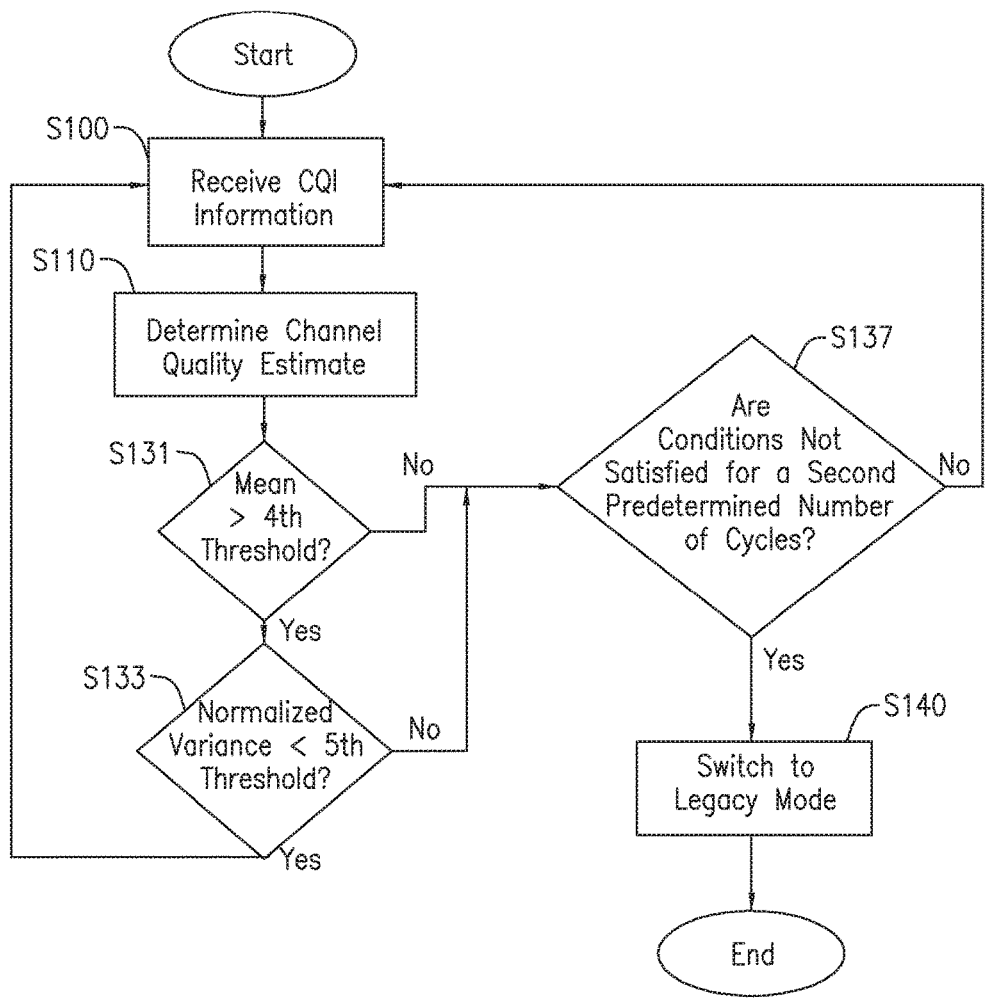
FIG. 6 is a flowchart illustrating an exemplary method for switching from a HoM mode to a legacy mode for communications with a wireless device in accordance with the principles of the present disclosure.

In certain instances, a modulation mode switch from HoM mode to legacy mode may be implemented. In FIG. 6, wireless device 14 is currently in HoM mode, and network node 12 receives CQI information from wireless device 14 (Block S100). Network node 12 then obtains the channel quality estimate from the CQI information (Block S110). Network node 12 determines if the mean of the channel quality estimate is greater than a fourth threshold amount (i.e., is $C(\bar{v}_k\theta)$?) (Block S131). If this first condition is satisfied, network node 12 determines if the normalized variance of the channel quality estimate is less than a fifth threshold amount (i.e., is $C(\tilde{v}_k<\sigma)$?) (Block S133). Note that $\theta$ and $\sigma$ represent, respectively, fourth and fifth threshold amounts that can be the same or different from the first and second threshold amounts discussed above. If both the first condition has been satisfied (Block S131) and the second condition has been satisfied (Block S133), the equation $(v_k)=C(\bar{v}_k>\theta)\wedge C(\tilde{v}_k<\sigma)$ has been satisfied, (mean is greater than a fourth threshold and the normalized variance is less than a fifth threshold). Thus, $C(x)=1$ and wireless device 14 remains in HoM mode.

However, if either of the conditions in Block S131 and Block S133 are not satisfied, it is determined if either of the conditions has not been satisfied for a second predetermined number of consecutive CQI information uplink transmissions from wireless device 14 (Block S137). For example, if network node 12 determines that in an uplink transmission with CQI report from wireless device 14 the mean values of the downlink channel quality estimate is less than or equal to a fourth threshold amount, a counter is incremented, and the same determination is made in the next uplink transmission with CQI report. If the mean of the downlink channel quality estimate is again determined to be less than or equal to a fourth threshold amount, the counter is incremented and this process repeated until the same determination has occurred for a predetermined number of consecutive uplink transmissions with CQI reports from wireless device 14, i.e., until the counter equals this predetermined number. This same process occurs with respect to the determination of whether the normalized variance of the channel quality estimate is less than a fifth threshold amount for a given number of consecutive CQI reports included in uplink transmissions. Similar to procedure for switching from legacy modulation mode to HoM mode as described in FIG. 4, a third quantity based on the channel quality measure estimated based on the received signals at the network node from wireless device 14 can also be used for switching from HoM mode to the legacy mode.

It should be noted that the second predetermined number of consecutive CQI information uplink transmissions from wireless device 14 need not be the same as the first predetermined number of consecutive CQI information uplink transmissions, discussed above with respect to switching from legacy mode to HoM mode (FIGS. 2 and 3). In one embodiment, the first predetermined number of consecutive CQI information uplink transmissions is different from the second predetermined number of consecutive CQI information uplink transmissions from wireless device 14. If either the first condition (mean>a fourth threshold) (Block S131) or the second condition (normalized variance<a fifth threshold) (Block S133) has not been met for the requisite second predetermined number of consecutive uplink transmissions, network node 12 sends an RRC connection reconfiguration message to wireless device 14 instructing it to switch from HoM mode to legacy mode (Block S145). Network node 12 may receive a RRC connection reconfiguration complete acknowledgment from wireless node 14. During the mode transition, a DCI format 1A or 1C may be used.

Carrier aggregation is used for transmission of signaling and data in the uplink and downlink directions. One of the component carriers (CCs) in carrier aggregation is the primary component carrier (PCC), also referred to as a primary carrier or anchor carrier. The remaining CCs are called secondary component carriers (SCCs), also referred to as secondary carriers or supplementary carriers. The serving cell, as used herein, is called a primary cell (PCell). Similarly the secondary serving cell, as used herein, is called a secondary cell (SCell).

In the case of carrier aggregation, when a SCell is configured for a wireless device 14, a HoM mode can be enabled during the setup of the SCell in order to reduce the number of RRC messages. One RRC Connection Reconfiguration Message is required to add the SCell and to configure the wireless device 14 to be in a HoM mode for the SCell. Configuring wireless device 14 in a HoM mode immediately after configuring a SCell has minimal negative performance impact if the SCell is added when the downlink quality is good.

When comparing transport block sizes (TBSs) between HoM and legacy modes, the TBSs for 16 QAM and lower and middle 64 QAM are almost the same for the two modes. For QPSK, HoM mode has approximately half of the TBSs that are available for legacy modulation mode. If the downlink quality of the SCell is not bad enough to be in the QPSK region, configuring wireless device 14 to be in the HoM mode can take advantage of 256 QAM without significant additional cost. If the downlink quality for the SCell is in the QPSK region, the penalty is the loss of TBS granularity in the region. However, the penalty is limited since the SCell does not typically contribute much to the wireless device's throughput due to the poor link quality.

Figure 7:
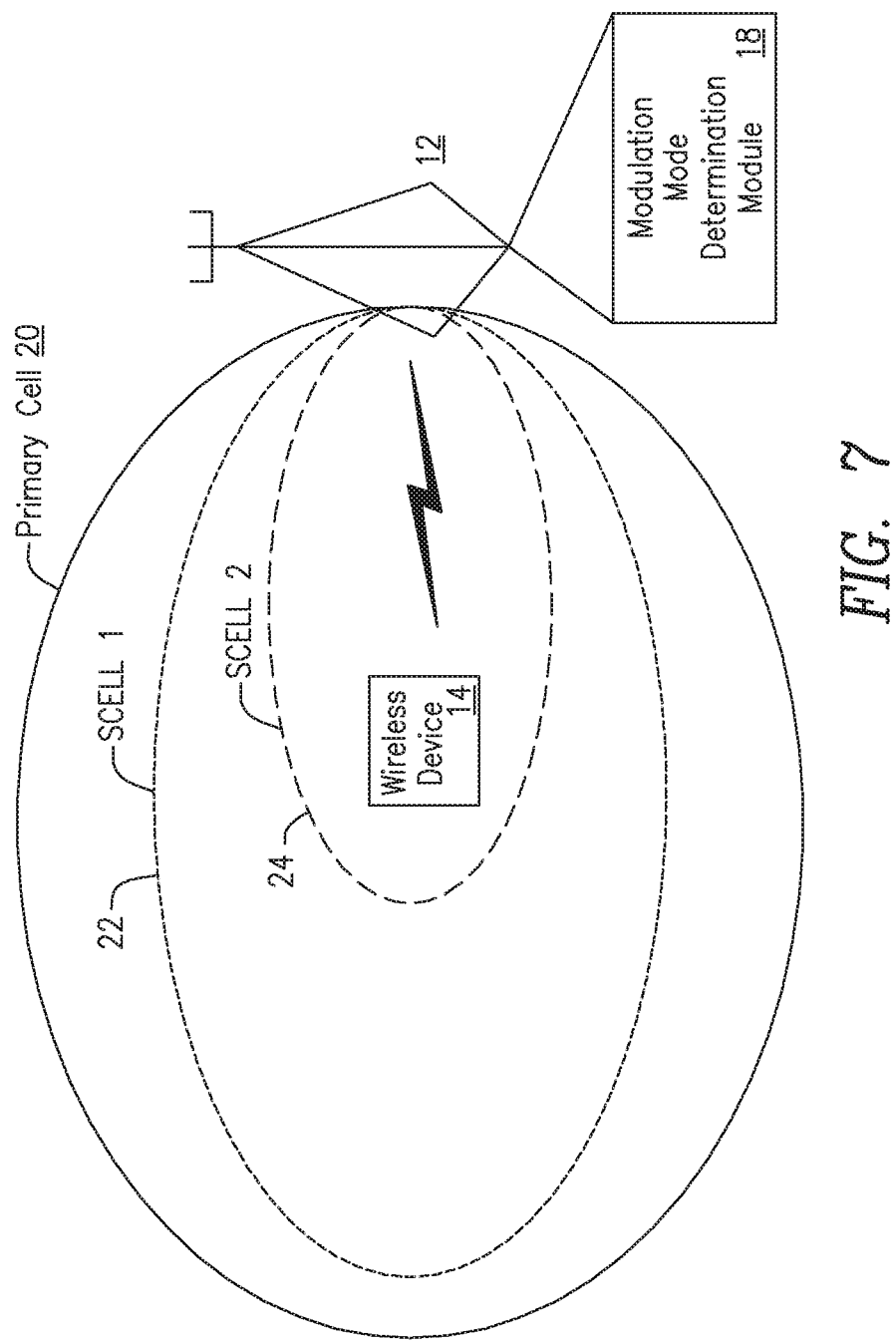
FIG. 7 is a block diagram of an exemplary system for setting a HoM mode when a secondary cell is added to the network device in accordance with the principles of the present disclosure.

FIG. 7 shows, in one embodiment, wireless device 14 is served by network node 12 with primary cell (PCell) 20. Wireless device 14 is also capable of being served by at least two secondary serving cells, e.g., SCell$_1$ 22 and SCell$_2$ 24. The term "served" or "being served" with respect to wireless device 14 means that wireless device 14 is configured with the corresponding cells, e.g., PCell and SCell(s), and can receive from and/or transmit data to network node 12 on the serving cell, e.g., on PCell or any of the SCells. Network node 12 includes a modulation determination module 18, which, as explained below, determines, based on a variety of parameters, whether to add a secondary cell to the network and whether to configure the wireless device 14 in a HoM mode for the secondary cell.

Figure 8:
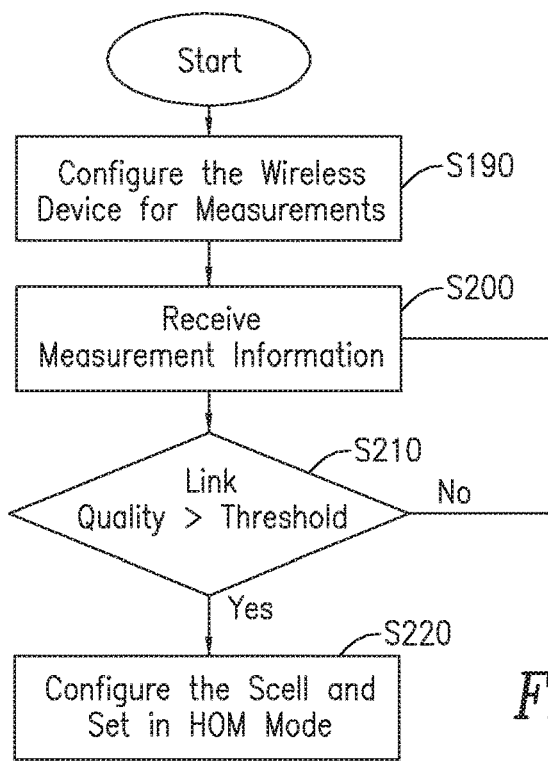
FIG. 8 is a flowchart illustrating a method for setting a HoM mode when a secondary cell is added to the network device based upon reported link quality measurements in accordance with the principles of the present disclosure.

The addition of a SCell may or may not be based on reported link quality measurements. FIG. 8 is a block diagram of an exemplary system for setting a HoM mode when a secondary cell is added to the network device based upon reported link quality measurements. Initially, wireless device 14 is configured to perform secondary cell measurements, for example, event A4 measurements, i.e., receive signal quality at the mobile device from a neighbor cell is better than a predefined threshold (Block S190). Network node 12 receives measurement information reported from wireless device (Block S200). The measured link quality with respect to wireless device 14 is compared to another threshold value (Block S210), where the threshold may be determined from both the secondary cell addition and the HoM mode perspective. If the link quality is less than the threshold value, network node 12 waits for the next measurement report from wireless device 14. If the link quality is greater than the threshold value, the secondary cell candidate, i.e., SCell$_1$ 22, is added to the network as a secondary cell and wireless device 14 is configured in a HoM mode for the secondary cell (Block S220).

Figure 9:
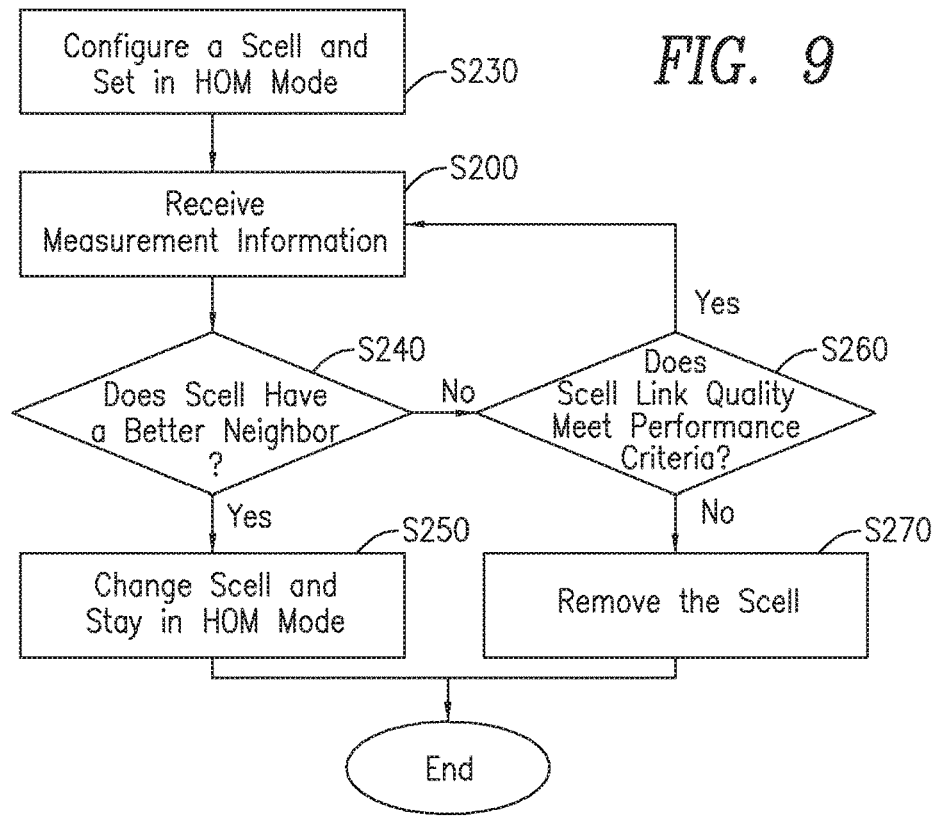
FIG. 9 is a flowchart illustrating an alternate method for setting a HoM mode when a secondary cell is added to the network device without knowledge of the link quality in accordance with the principles of the present disclosure.

FIG. 9 is a flowchart illustrating an alternate method for setting a HoM mode when a secondary cell (i.e., Scell$_1$ 22 in FIG. 7) is added to the network device without knowledge of the link quality of the secondary cell 22. Initially, the secondary cell, SCell$_1$ 22 is configured in HoM mode (Block S230). Wireless device 14 is configured to perform measurements, for example, event A1, A4 and/or A6 measurements, and these measurements are sent by wireless device 14 in a measurement report where it is received by network node 12 (Block S200). If the measurement report indicates that the newly added secondary cell SCell$_1$ 22 has a neighbor secondary cell (i.e., SCell$_2$ 24 in FIG. 7) that has a higher link quality (Block S240), secondary cell SCell$_1$ 22 is replaced by SCell$_2$ 24 while wireless device 14 remains in HoM mode (Block S250). If it is determined that there is no other secondary cell that has a better link quality than secondary cell Rah 22, the measurement report received from wireless device 14 is analyzed to determine if the link quality of the newly added secondary cell SCell$_1$ 22 meets a performance criteria (Block S260). The performance criteria may be determined from both the expected throughput improvements due to the addition of secondary cell SCell$_1$ and the sustainability of HoM mode configuration in secondary cell SCell$_1$. If the performance criteria are met, no action is taken and network node 12 waits for the next measurement report to be received (Block S200). If the performance criteria are not met, the newly added secondary cell SCell$_1$ 22 is removed as a communication option for wireless device 14 (Block S270). In either scenario, if secondary cell SCell$_1$ 22 cannot be used for HoM mode communication, it is not used at all for communication with wireless device 14.

An example of the performance criteria used for this purpose can be outlined as follows:

$$f(v_k)=C(\bar{v}_k>\eta_{SCell})\wedge C(\tilde{v}_k<\zeta_{SCell})$$

where $v_k$, $\bar{v}_k$ and $\tilde{v}_k$ are the downlink channel quality estimate, the mean of the channel quality estimate and the normalized variance of the channel quality estimate respectively. $v_k$ is the channel quality estimate determined from the measurement reports and/or CQI reports received from the mobile device 14. $\eta_{SCell}$ and $\zeta_{SCell}$ are the thresholds applied on the mean and the normalized variance of the estimated channel quality to ascertain the additional capacity for addition of the secondary cell SCell$_1$ and the sustainability of HoM mode in the secondary cell Scell$_1$ respectively. When $f(v_k)=1$, the secondary cell SCell$_1$ 22 continues to be used as the secondary cell for wireless device 14.

The above metric can also be modified with the additional check based on the uplink channel quality estimate in the secondary cell SCell$_1$ as follows:

$$f(v_k)=C(\bar{v}_k>\eta_{SCell})\wedge C(\tilde{v}_k<\zeta_{SCell})\wedge(\delta\geq\delta_{0\text{-}SCELL})$$

where $\delta$ and $\delta_{0\text{-}SCELL}$ are the estimate of the relative strength of the LOS component on the uplink transmission and a threshold on the relative strength of the LOS component required to reduce the probability of switching back to the legacy modulation mode.

Figure 10:
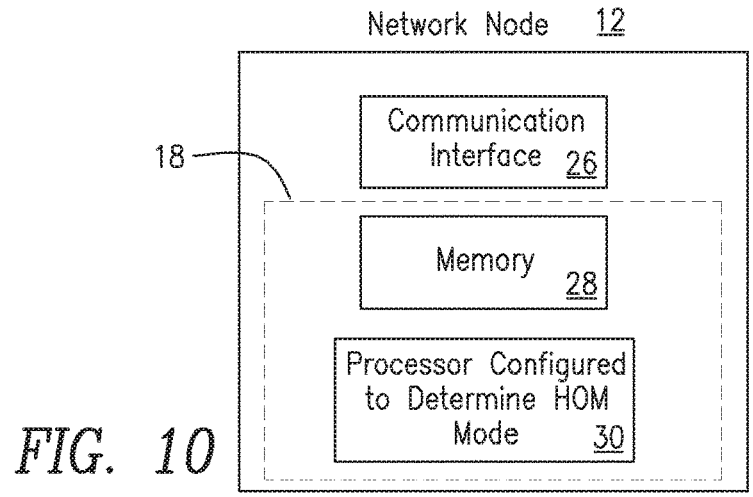
FIG. 10 is a block diagram of an exemplary base station configured to determine a HoM mode for communications with a wireless device in accordance with the principles of the present disclosure.

FIG. 10 illustrates a network node 12 in accordance with embodiments of the present disclosure. In one embodiment, network node 12 is a base station configured for selectively using a HoM mode for communications with wireless device 14 in a wireless communication network 10. Network node 12 includes a communication interface 26 configured to receive CQI information from an uplink transmission of wireless device 14, and modulation mode determination module 18. In one embodiment, modulation mode determination module 18 includes processor 30 configured to determine the HoM mode for wireless device 14 and memory 28. It is understood that, in other embodiments, modulation mode determination module 18 may include additional hardware and/or software components and may take a different structural form such as a programmable gate array (PGA), or an application-specific integrated circuit (ASIC). Memory 28 may include non-volatile and/or volatile memory. For example, non-volatile memory may include a hard drive, flash memory, programmable integrated circuits, memory stick, solid state memory and the like. Also, volatile memory may include random access memory and others known in the art. Memory 28 stores program instructions such as those for modulation mode determination module 18. For example, memory 28 of modulation determination module 18 includes instructions that, when executed by processor 30, configure processor 30 to determine a downlink channel quality estimate from the CQI information, and when a measurement of the channel quality estimate satisfies a predetermined criteria for a first predetermined number of CQI information consecutive uplink transmissions from the wireless device, switch a downlink transmission mode of wireless device 14 from a first modulation mode to a second modulation mode. In one embodiment, the first modulation mode can be a legacy mode, and the second modulation mode can be a HoM mode.

Figure 11:
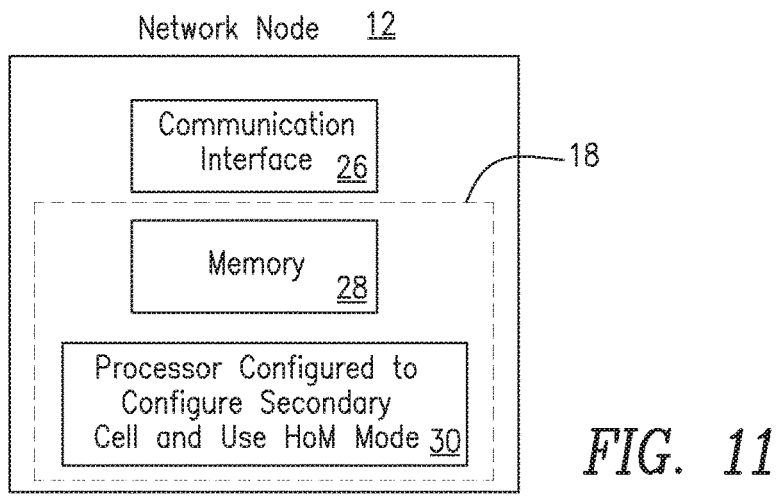
FIG. 11 is a block diagram of an exemplary network node configured as a secondary cell in accordance with an embodiment of the present disclosure.

FIG. 11 illustrates a network node 12 in accordance with an embodiment of the present disclosure where network node 12 is a base station configured as a secondary cell 22 for selectively using a HoM mode for communications with wireless device 14 in a wireless communication network 10. Network node 12 includes a communication interface 26 configured to receive, from wireless device 14, measurement information for secondary cell 22, the measurement information including a measured link quality for secondary cell 22. Network node 12 also includes modulation mode determination module 18, which may include a processor 30 and memory 28. Memory 28 of modulation mode determination module 18 stores instructions that, when executed, configure processor 30 to, when the measured link quality is greater than a predetermined threshold, configure secondary cell 22 for wireless communications with wireless device 14, and use the HoM mode for downlink communications with wireless device 14.

Figure 12:
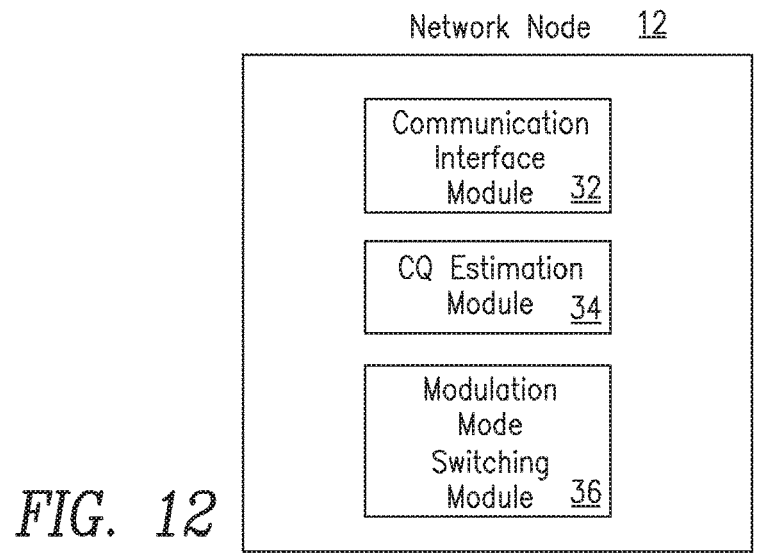
FIG. 12 is a block diagram of an alternative network node configured to determine a HoM mode for communications with a wireless device in accordance with the principles of the present disclosure.

FIG. 12 illustrates a network node 12 in accordance with an alternate embodiment of the present disclosure. Network node 12 is configured for selectively using a HoM mode for communications with wireless device 14 in a wireless communication network 10. Network node 12 includes a communication interface module 32 configured to receive CQI information from an uplink transmission of wireless device 14, a channel quality estimation module 34 for determining a downlink channel quality estimate from the CQI information, and a modulation mode switching module 36 configured to, when a measurement of the channel quality estimate satisfies a predetermined criteria for a first predetermined number of consecutive CQI information uplink transmissions from wireless device 14, switch a downlink transmission mode of wireless device 14 from a first modulation mode to a second modulation mode. In one embodiment, the first modulation mode can be a legacy mode, and the second modulation mode can be a HoM mode.

In another embodiment of the present disclosure considered from the point of view of wireless device 14, a method for using a HoM mode for communication with a base station in a wireless communication network is provided. In this embodiment, wireless device 14 sends, in an uplink transmission, downlink CQI information to network node 12, such as a base station. When a measurement of a downlink channel quality estimate satisfies a predetermined criteria for a first predetermined number of consecutive CQI information uplink transmissions from wireless device 14, wireless device 14 receives a request to switch a downlink transmission mode from a first modulation mode to the HoM mode. In one embodiment, the predetermined criteria is the mean of the downlink channel quality estimate being greater than a first threshold amount, and a normalized variance of the downlink channel quality estimate being less than a second threshold amount. In another embodiment, during the first predetermined number of consecutive CQI information uplink transmissions from wireless device 14, when at least one of the means of the downlink channel quality estimate is not greater than the first threshold amount and the normalized variance is not less than the second threshold amount, the downlink transmission mode of wireless device 14 in the first modulation mode is maintained.

In another embodiment, the present disclosure provides a wireless device 14 that includes a processor and a memory for storing instructions that, when executed, configure the processor to send, in an uplink transmission, downlink CQI information to network node 12, such as a base station. When the processor of wireless device 14 determines that a measurement of a downlink channel quality estimate satisfies a predetermined criteria for a first predetermined number of consecutive CQI information uplink transmissions from wireless device 14, wireless device 14 receives a request to switch a downlink transmission mode from a first modulation mode to the HoM mode. In one embodiment, the predetermined criteria is the mean of the downlink channel quality estimate being greater than a first threshold amount, and a normalized variance of the downlink channel quality estimate being less than a second threshold amount. In another embodiment, during the first predetermined number of consecutive CQI information uplink transmissions from wireless device 14, when at least one of the means of the downlink channel quality estimate is not greater than the first threshold amount and the normalized variance is not less than the second threshold amount, the downlink transmission mode of wireless device 14 in the first modulation mode is maintained.

As will be appreciated by one of skill in the art, the concepts described herein may be embodied as a method, data processing system, and/or computer program product. Accordingly, as noted above, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Although some of the diagrams include arrows on communication paths to show a primary direction of communication, it is to be understood that communication may occur in the opposite direction to the depicted arrows. Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments may be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method for using a higher order modulation, HoM, mode for communications with a wireless device in a wireless communication network, the method comprising:
   receiving downlink channel quality indicator, CQI, information from an uplink transmission of the wireless device;
   determining a downlink channel quality estimate from the CQI information; and
   when a measurement of the downlink channel quality estimate satisfies a predetermined criteria for each consecutive CQI information uplink transmission of a first predetermined number of consecutive CQI information uplink transmissions from the wireless device, wherein the predetermined criteria comprises a mean of the downlink channel quality estimate being greater than a first threshold amount, and a normalized variance of the downlink channel quality estimate being less than a second threshold amount;
      switching a downlink transmission mode of the wireless device from a first modulation mode to the HoM mode.

2. The method of claim 1, wherein the normalized variance of the downlink channel quality estimate comprises a variance of the downlink channel quality estimate normalized to the mean of the channel quality estimate.

3. The method of claim 1, wherein during the first predetermined number of consecutive CQI information uplink transmissions from the wireless device, when at least one of the means of the downlink channel quality estimate is not greater than the first threshold amount and the normalized variance is not less than the second threshold amount: maintaining the downlink transmission mode of the wireless device in the first modulation mode.

4. The method of claim 1, wherein the first and the second threshold amounts are determined based at least on a performance metric of the HoM mode.

5. The method of claim 4, wherein the performance metric is a measure of spectral efficiency.

6. The method of claim 1, further comprising:
   measuring the uplink transmission of the wireless device to obtain an uplink channel quality component; and
   switching the downlink transmission mode of the wireless device from the first modulation mode to the HoM mode based at least on whether:
      the mean of the downlink channel quality estimate is greater than a first threshold amount;
      the normalized variance of the downlink channel quality estimate is less than the second threshold amount; and
      the uplink channel quality component is not less than a third threshold amount.

7. The method of claim 6, wherein the uplink channel quality component comprises an estimate of a ratio of a strength of a first path that contains a line-of-sight, LOS, channel component to a strength of a non-LOS channel component.

8. The method of claim 6, further comprising:
   assigning a first scaling parameter to a first determination of whether the mean of the downlink channel quality estimate is greater than the first threshold amount to obtain a first weighted metric;
   assigning a second scaling parameter to a second determination of whether the normalized variance of the downlink channel quality estimate is less than the second threshold amount to obtain a second weighted metric;
   assigning a third scaling parameter to a third determination of whether the uplink channel quality component is not less than the third threshold amount to obtain a third weighted metric; and
   switching the downlink transmission mode of the wireless device from the first modulation mode to the HoM mode based at least on the first weighted metric, the second weighted metric and the third weighted metric.

9. The method of claim 8, wherein the first, second and third scaling parameters are based at least on a measurement accuracy of the mean of the downlink channel quality estimate, the normalized variance of the downlink channel quality estimate and the uplink channel quality component.

10. The method of claim 1, wherein for a second predetermined number of consecutive uplink transmissions from the wireless device, if at least one of the means of the downlink channel quality estimate is not greater than a fourth threshold amount and the normalized variance is not less than a fifth threshold amount, switching the downlink transmission mode of the wireless device from the HoM mode to the first modulation mode.

11. The method of claim 1, wherein determining the downlink channel quality estimate from the CQI information comprises mapping the CQI information to a signal to interference plus noise ratio, SINR.

12. The method of claim 1, wherein determining the downlink channel quality estimate from the CQI information comprises estimating a spectral efficiency of the downlink transmission from the CQI information.

13. The method of claim 1, wherein the uplink transmission includes at least one of a sounding reference symbol, SRS, measurement, a physical random access channel, PRACH, a physical uplink control channel, PUCCH, and a physical uplink shared channel, PUSCH.

14. The method of claim 1, wherein determining the downlink channel quality estimate from the CQI information comprises mapping the CQI information to a modulation and coding scheme, MCS, value upon occurrence of a downlink transmission to the wireless device.

15. The method of claim 1, further comprising determining whether to add a secondary cell to support wireless communications with the wireless device, the determining comprising:
configuring the wireless device to perform secondary cell measurements;
receiving, from the wireless device, measurement information for the secondary cell, the measurement information including a measured link quality for the secondary cell; and
when the measured link quality is greater than a predetermined threshold:
configuring the secondary cell for wireless communications with the wireless device; and
using the HoM mode for downlink communications with the wireless device.

16. The method of claim 1, further comprising determining whether to add a secondary cell to support wireless communications with the wireless device, the determining comprising:
configuring the secondary cell for wireless communications with the wireless device using the HoM mode for downlink communications;
receiving, from the wireless device, measurement information, the measurement information including a measured link quality for neighboring secondary cells including the secondary cell configured for HoM mode downlink communications with the wireless device;
when the measurement information indicates that at least one neighboring secondary cell has a greater link quality than the measured link quality for the secondary cell, changing support for wireless communications with the wireless device from the secondary cell to the neighboring secondary cell and maintaining the HoM mode for downlink communications; and
when the measurement information does not indicate that at least one neighboring secondary cell has a greater link quality than the measured link quality for the secondary cell and the measured link quality for the secondary cell does not meet a performance criteria, removing the secondary cell for wireless communications with the wireless device.

17. A base station configured for selectively using a higher order modulation, HoM, mode for communications with a wireless device in a wireless communication network, the base station comprising:
a communication interface configured to receive channel quality indicator, CQI, information from an uplink transmission of the wireless device;
a processor; and
a memory storing instructions that, when executed, configure the processor to:
determine a downlink channel quality estimate from the CQI information; and
when a measurement of the channel quality estimate satisfies a predetermined criteria for each consecutive CQI information uplink transmission of a first predetermined number of consecutive CQI information uplink transmissions from the wireless device; wherein the predetermined criteria comprises a mean of the downlink channel quality estimate being greater than a first threshold amount, and a normalized variance of the downlink channel quality estimate being less than a second threshold amount;
switch a downlink transmission mode of the wireless device from a first modulation mode to a second modulation mode.

18. The base station of claim 17, wherein determining the downlink channel quality estimate from the CQI information comprises mapping the CQI information to a signal to interference plus noise ratio, SINR.

19. The base station of claim 17, wherein determining the downlink channel quality estimate from the CQI information comprises estimating a spectral efficiency of the downlink transmission from the CQI information.

20. The base station of claim 17, wherein the normalized variance of the downlink channel quality estimate comprises a variance of the downlink channel quality estimate normalized to the mean of the channel quality estimate.

21. The base station of claim 17, wherein during the first predetermined number of consecutive CQI information uplink transmissions from the wireless device, when at least one of the mean is not greater than the first threshold amount and the normalized variance is not less than the second threshold amount, the processor is further configured to maintain the downlink transmission mode of the wireless device in the first modulation mode.

22. The base station of claim 17, wherein the first and the second threshold amounts are determined based at least on a performance metric of the HoM mode.

23. The base station of claim 22, wherein the performance metric is a measure of spectral efficiency.

24. The base station of claim 17, wherein the processor is further configured to:
measure the uplink transmission of the wireless device to obtain an uplink channel quality component; and
switch the downlink transmission mode of the wireless device from the first modulation mode to the HoM mode based at least on whether:
the mean of the downlink channel quality estimate is greater than a first threshold amount;
the normalized variance of the downlink channel quality estimate is less than the second threshold amount; and
the uplink channel quality component is not less than a third threshold amount.

25. The base station of claim 24, wherein the uplink channel quality component comprises an estimate of a ratio of a strength of a first path that contains a line-of-sight, LOS, channel component to a strength of a non-LOS channel component.

26. The base station of claim 24, wherein the processor is further configured to:
assign a first scaling parameter to a first determination of whether the mean of the downlink channel quality estimate is greater than the first threshold amount to obtain a first weighted metric; assign a second scaling parameter to a second determination of whether the normalized variance of the downlink channel quality estimate is less than the second threshold amount to obtain a second weighted metric;
assign a third scaling parameter to a third determination of whether the uplink channel quality component is at least equal to the third threshold amount to obtain a third weighted metric; and
switch the downlink transmission mode of the wireless device from the first modulation mode to the HoM mode based at least on the first weighted metric, the second weighted metric and the third weighted metric.

27. The base station of claim 26, wherein the first, second and third scaling parameters are based at least on a measurement accuracy of the mean of the downlink channel quality estimate, the normalized variance of the downlink channel quality estimate and the uplink channel quality component.

28. The base station of claim 17, wherein for a second predetermined number of consecutive CQI information uplink transmissions from the wireless device, if at least one of the means is not greater than a fourth threshold amount and the normalized variance is not less than a fifth threshold amount, the processor is further configured to switch the downlink transmission mode of the wireless device from the HoM mode to the first modulation mode.

29. The base station of claim 17, wherein the uplink transmission includes at least one of a sounding reference symbol, SRS, measurement, a physical random access channel, PRACH, a physical uplink control channel, PUCCH, and a physical uplink shared channel, PUSCH.

30. The base station of claim 17, wherein determining the downlink channel quality estimate from the CQI information comprises mapping the CQI information to a modulation and coding scheme, MCS, value upon occurrence of a downlink transmission to the wireless device.

* * * * *